United States Patent
Imhof

Patent Number: 5,085,254
Date of Patent: Feb. 4, 1992

[54] PROCESS AND DEVICE FOR THE CONTINUOUS FILLING OF FIBER STRUCTURE ELECTRODE FRAMES PROVIDED WITH CURRENT DISCHARGE USE

[75] Inventor: Otwin Imhof, Nürtingen, Fed. Rep. of Germany

[73] Assignee: Deutsche Automobilgesellschaft mbh, Fed. Rep. of Germany

[21] Appl. No.: 640,507

[22] Filed: Jan. 7, 1991

Related U.S. Application Data

[63] Continuation of Ser. No. 373,444, Jun. 30, 1989, abandoned.

[30] Foreign Application Priority Data

Jul. 1, 1988 [DE] Fed. Rep. of Germany ....... 3822197

[51] Int. Cl.$^5$ .................. H01M 4/28; B65G 49/04
[52] U.S. Cl. ........................ 141/1.1; 141/32; 141/11; 141/75; 366/108; 15/21.1; 15/256.5; 29/623.5
[58] Field of Search ............... 366/116–123, 366/108; 222/196, 197, 200, 201; 141/1.1, 32, 71–75, 80, 103, 240, 85, 12, 89, 115, 125, 11; 29/2, 623.1, 623.5; 429/233, 225

[56] References Cited

U.S. PATENT DOCUMENTS

| | | | |
|---|---|---|---|
| 1,407,104 | 2/1922 | Walker | 141/125 |
| 1,855,918 | 4/1932 | McCord | 141/32 |
| 1,975,039 | 9/1934 | Goodrich et al. | 141/32 |
| 2,058,134 | 10/1936 | Coldwell | 141/32 |
| 2,883,815 | 4/1959 | Maitino | 141/103 X |
| 3,261,286 | 7/1966 | Hunter et al. | 15/210 X |
| 3,262,815 | 7/1966 | Langer et al. | 429/206 |
| 3,758,340 | 9/1973 | Adams | 141/1.1 |
| 3,841,362 | 10/1974 | Haller et al. | 141/32 |
| 3,859,135 | 1/1975 | Roberts et al. | 141/1.1 |
| 3,884,717 | 5/1975 | Buder et al. | 141/1.1 |
| 4,217,733 | 8/1980 | Van Sickle | 15/210 X |
| 4,217,939 | 8/1980 | Yanagihara et al. | 141/1.1 |
| 4,271,876 | 6/1981 | Nash et al. | 141/125 X |
| 4,664,990 | 5/1987 | Clark et al. | 29/623.1 X |
| 4,974,644 | 12/1990 | von Benda et al. | 141/1.1 |

FOREIGN PATENT DOCUMENTS

| | | | |
|---|---|---|---|
| 1210417 | 8/1966 | Fed. Rep. of Germany. | |
| 1287663 | 1/1969 | Fed. Rep. of Germany. | |
| 491512 | 5/1970 | Fed. Rep. of Germany. | |
| 1496352 | 2/1971 | Fed. Rep. of Germany. | |
| 0458295 | 7/1950 | Italy | 141/32 |
| 55-25913 | 2/1980 | Japan | 141/1.1 |
| 55-115265 | 9/1980 | Japan | 141/32 |
| 55-139763 | 10/1980 | Japan. | |
| 56-6460 | 7/1981 | Japan | 141/1.1 |
| 58-71559 | 4/1983 | Japan | 141/1.1 |
| 641594 | 2/1984 | Switzerland. | |
| 0787872 | 12/1957 | United Kingdom | 141/12 |
| 2041631 | 9/1980 | United Kingdom | 141/32 |

Primary Examiner—Henry J. Recla
Assistant Examiner—Casey Jacyna
Attorney, Agent, or Firm—Evenson, Wands, Edwards, Lenahan & McKeown

[57] ABSTRACT

A process and device provide for the virtually continuous vibration filling with active compound of empty fiber structure electrode plaques having a welded-on current discharge lug for electric accumulators. The empty fiber structure electrode plaques are inserted into a transport device having an adjustable cycle time which passes the plaques through a trough filled with active compound in which the active compound is vibrated. The fiber structure electrode plaques are then removed from the trough, excess active compound is stripped off, sides and the edges of plaque are freed from residues of excess active compound by various brushes. The filled fiber structure electrode plaque is then removed from the transport device, after prior drying, if required.

23 Claims, 1 Drawing Sheet

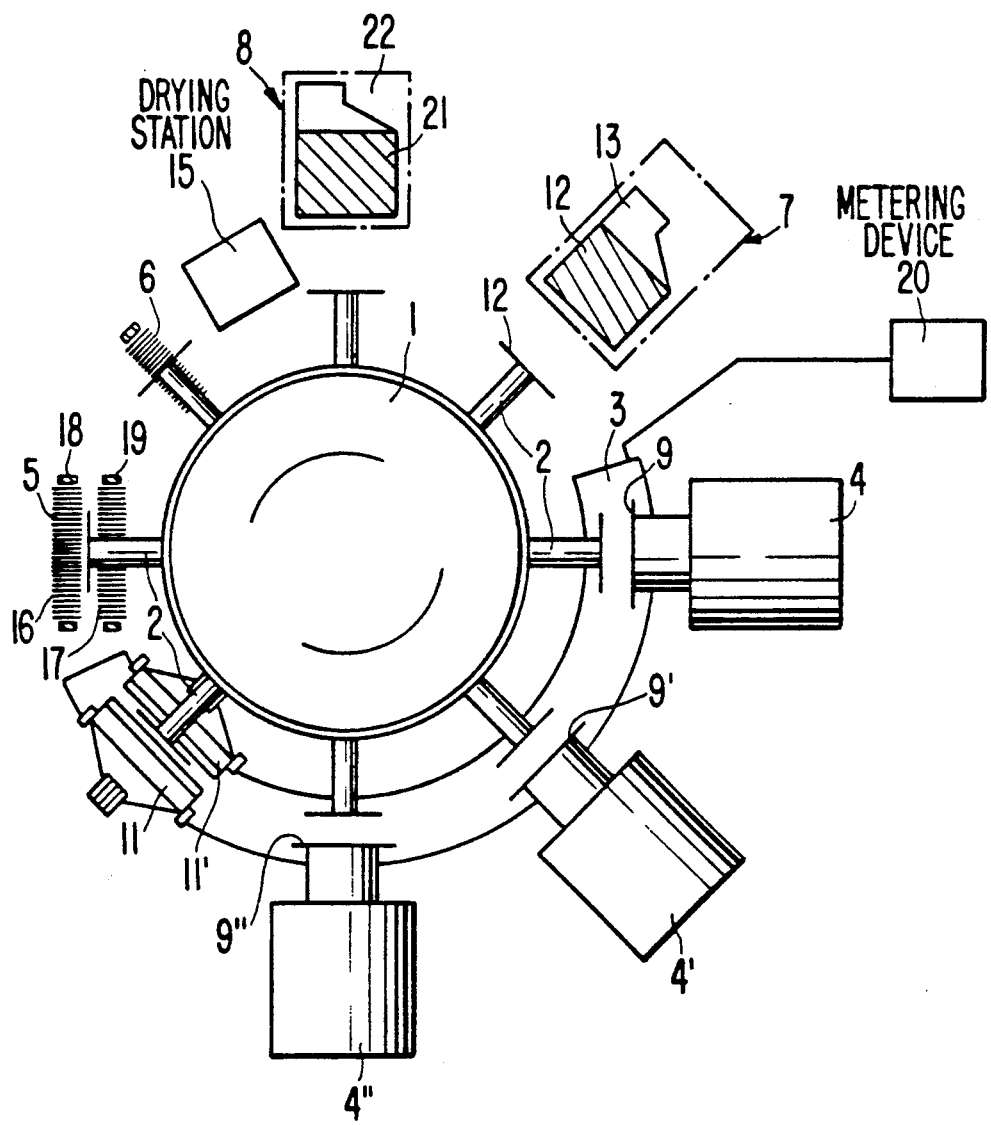

PROCESS AND DEVICE FOR THE CONTINUOUS FILLING OF FIBER STRUCTURE ELECTRODE FRAMES PROVIDED WITH CURRENT DISCHARGE USE

This is a continuation of application Ser. No. 07/373,444, filed June 30, 1989, now abandoned.

BACKGROUND AND SUMMARY OF THE INVENTION invention relates to a process and device for the virtually continuous filling of fiber structure electrode plaques for accumulators with an active compound paste under the action of vibrations, the plaques being provided with current discharge lugs.

Electrodes for voltaic cells can be produced by filling a porous electrode plaque, e.g. a metal or metallized plastics foam or a metal fiber structure plaque or a metallized plastics fiber structure plaque, with active fillers including an active compound. In order to facilitate and complete the introduction of the active compound into the pores of the plaque, mechanical or physical aids such as rollers, doctor blades, as well as the action of vibrations, in particular ultrasound, are used.

A process for depositing disperse substances in porous bodies is described in German Patent Specification 1,210,417 wherein an ultrasonic vibrator is covered with a disperse substance made up into a paste of viscous consistency, the porous body is laid on top of the vibrator, covered with a layer of disperse substance of the same consistency as that covering the vibrator and, with simultaneous ultrasonic excitation, the porous body is pressed against the ultrasonic vibrator. As soon as the ultrasonic vibrations are switched off, the filled body is removed from the device. This process is exceptionally labor intensive and hence cost intensive and there are difficulties in the removal of the filled body from the device.

U.S. Pat. No. 3,262,815 describes a continuous process for the production of battery electrodes in which a strip of steel wool is first metallized electrolytically and is then covered with a layer of a slurry of an active electrode material. The active electrode material is sucked into interspaces in the strip with the aid of an applied vacuum. The strip is then washed, dried, compressed between rollers and cut to electrode size. A current discharge element must be secured on the finished electrode, which, as experience has shown, does not produce particularly durable connections. In the disclosure of U.S. Pat. No. 3,262,815, a total of three different methods are described for filling electrode plaques and it is stated that complete filling of the plaque cannot be achieved by one method alone, this indeed being indicated in addition by the compacting of the filled lattice necessary in the continuous process. In the patent, it is therefore proposed that a combination of all three methods be employed, namely immersion, covering with a layer and mechanical working-in. Nevertheless, it is not possible even with this combined filling method to dispense with the compacting of the filled plaque. Thus, because of the large number of treatment steps, this process too is quite expensive.

It is an object of the invention to provide a simple process and a device for filling fiber structure electrode plaques provided with welded-on current discharge lugs which can be carried out simply, inexpensively and rapidly and can proceed largely automatically.

In the process and the device, an unfilled fiber structure electrode plaque is first secured by its current discharge lug in a transport device. This transport device can comprise a chain conveyor or a carousel conveying device. The work carrier of the transport device is designed such that various formats of fiber structure electrode plaques can be secured without the need to change the work carrier and so that the electrode plaque cannot slip out during transport. The securing of the fiber structure electrode plaques in the transport device can be accomplished both manually and by an automatic handling device.

With the aid of the transport device, the fiber structure electrode plaques are then transported in succession to individual processing stations, in which one process step, in each case, is carried out separately from the others. The electrode plaques are conveyed from one station to the next processing station at the same time. The cycle time for this transfer process can be adjusted and is preferably between about 5 sec and 25 sec.

Following the securing of the fiber structure electrode Plaque on the transport device, the fiber structure electrode plaques are immersed in a filling chamber provided with active compound. During this procedure, the fiber structure electrode plaques are preferably guided by guide plates, so that they cannot touch the edge of the vessel. The active compound in the filling chamber is vibrated in order to permit easy penetration of the active compound into the pores of the fiber structure electrode plaque.

The vibrations are preferably generated by a vibrating plate, the principal extension of which is arranged substantially vertically and which is moved back and forth, in an oscillatory manner, substantially perpendicularly to a face of the fiber structure electrode plaque. The vibrating plate can be driven in a wide variety of ways, e.g. by an unbalance motor, by a rapper or an electric vibrator.

It has proven advantageous if the vibrating plate is moved towards and away from the fiber structure electrode plaque at a frequency of about 30 Hz to 100 Hz. Instead of a vibrating plate, it is also possible to employ an internal electric vibrator.

For filling, the electrode plaque to be filled is arranged substantially parallel to the vibrating plate at a distance of about 2 to 30 mm, a distance of about 5 to 15 mm being preferred. In operation, the vibrating plate moves in parallel towards the Principal surface of the plaque and away from it again during transport. At maximum amplitude of the vibrating plate, the wall of the filling vessel must not be touched. An additional distance between the vibrating plate and the wall is suggested so that the active compound in the interspace between vibrating plate and wall cannot splash.

The fiber structure electrode plaque is filled as it is transported through the filling vessel or chamber provided with the active compound. The length of the filling chamber or the dwell time in the filling chamber is to be adapted depending on the time required for filling. In the case of relatively long filling chambers, it is advisable to arrange a plurality of vibrating plates in the filling chamber.

At the end of the filling chamber, the fiber structure electrode plaque filled with paste is removed from the chamber and during the removal procedure is freed from the bulk of the adhering paste on the principal surfaces of the plaque by two mutually opposite scrapers which are applied automatically. The paste stripped off drips back immediately into the filling chamber and is not lost. Lips of the scrapers are preferably produced from nickel sheet.

The fiber structure plaque then passes into a cleaning station having two brushing rollers, rotating in opposite directions, which free the faces and the long end faces of the filled fiber structure electrode plaques of residues of active compound remaining in recesses and other residues of active compound still adhering, e.g. at the transition between the plaque and the current discharge lug. For this purpose, the electrode is lowered between the rotating brushing rollers and pulled out again, or the brushing rollers are moved correspondingly over the fiber structure electrode plaque. To ensure that the brushing roller is not clogged, each of them is allocated a stripping roller which rotates with it and in addition deflects the bristles in such a way that adhering paste particles are sprayed off into a collecting housing of the brushing station. In addition, it is also possible, depending on the viscosity of the paste, the electrode thickness and the electrode format, for the brushing rollers to be rinsed with water at set intervals.

After the brushing of the side faces, the active compound is removed in a further step from edges which have not yet been cleaned. This is primarily the lower end face of the filled electrode. This end face is brushed down by a brushing roller whose axis is perpendicular to the face of the plaque. After this last cleaning step, the filled, moist electrodes can be dried, e.g. by circulating air or an infrared lamp and then removed from the transport device, or they are removed immediately and only then dried.

Other objects, advantages and novel features of the present invention will become apparent from the following detailed description of the invention when considered in conjunction with the accompanying drawings.

BRIEF DESCRIPTION OF THE DRAWING

The single Figure schematically illustrates, in a top plan view, a filling process and device for fiber structure electrode plaques in accordance with one embodiment of the present invention.

DETAILED DESCRIPTION OF THE DRAWING

The filling device comprises a transport carousel 1 which is equipped with transport arms 2 as shown in the single Figure. Around the carousel are arranged an insertion station 7, a paste tank 3, a face brushing station 5, an edge brushing station 6 and a removal station 8. The paste in the paste tank 3 is vibrated by, for example, three vibrators 4 to 4'', which include vibrating plates 9 to 9'' projecting substantially vertically into the paste, for transmitting vibrational energy to the paste.

At the insertion station 7, an empty fiber structure electrode plaque 12 with a porosity of about 50% to 97%, illustrated in a plan view of the flat side with a lug 13 at the top of the plaque, is suspended substantially vertically on the transport arm 2. The transport arm 2 is guided by the transport carousel, rotating in the clockwise direction, over the paste tank 3 and the fiber structure electrode plaque 12 is immersed in the active compound paste. The fiber structure plaque 12 is then guided through the paste vibrated by means of the vibrating plates 9 to 9'' of vibrators 4 to 4'' and is taken out again at the end of the tank 3. During the removal procedure, the excess paste is stripped off from the fiber structure electrode plaque 12 by two lips 11, 11'. The coarsely pre-cleaned fiber structure electrode plaque then passes through the face brushing station 5 comprising two brushes 16, 17 with associated stripper rollers 18, 19, respectively, in which the faces of the filled fiber structure electrode plaque 12 are cleaned, and then into the edge brushing station 6, in which essentially the lower edge of the filled fiber structure electrode plaque 12 is cleaned. In the removal station 8, the cleaned and filled fiber structure electrode plaque 12 is then removed by a conventional removal device 22 from the transport arm 2. It can then be fed to a drying station. It is also possible, given an appropriate design of the transport system, to insert a drying station 15 even before the removal station 8. It is also possible to insert a metering device 20 for metering the fresh active compound into the tank 3 in the vicinity at which the plaque 12 is immersed in the tank 3 in an amount substantially equivalent to removal of the active compound from the tank 3 by the filled plaque 21.

The advantages achievable with the invention lie in particular in the fact that fiber structure electrode plaques having a welded-on current discharge element can be filled automatically, that there is very little manual work to be done, that very large numbers of pieces can be processed and that Production is cheap, economical and ecologically beneficial. Furthermore, a very uniform quality of the individual fillings is obtained since each plaque passes through each step of the process in the same way. Uniform filling in the case of pastes having differing flow properties and in the case of different electrode thicknesses can be achieved at all times by an individually appropriate dwell time (adjustment of the cycle time or intensity of the vibrators).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A process for continuous vibration filling with an active compound of discrete porous fiber structure electrode plaques for electric accumulators, each plaque having a current discharge lug, the process comprising the steps of:
   a) transporting with a transport device an individual freely vertically suspended porous fiber structure electrode plaque secured by its current discharge lug to a vessel filled with a vibrating active compound;
   b) immersing all sides of vertically suspended plaque in the vessel filled with a vibrating active compound;
   c) transporting the vertically suspended plaque through the vibrating active compound until filled with the active compound;
   d) removing the plaque from the vessel once filled;
   e) cleaning excessive active compound from the plaque; and
   f) detaching the filled and cleaned plaque at a removal station from the transport device.

2. A process according to claim 1, wherein each porous fiber structure electrode plaque has a porosity of about 50% to 97%.

3. A process according to claim 1, wherein the vibrating active compound vibrates in a direction substantially perpendicular to a principal surface of the immersed, attached plaque.

4. A process according to claim 1, wherein the step of cleaning the attached plaque comprises scraping excess active compound from sides of the plaque.

5. A process according to claim 4, wherein a pair of scrapers are used for scraping excess active compound from the sides of the plaque.

6. A process according to claim 4, wherein the scraping of excess active compound from the sides of the plaque is accomplished as the plaque is removed from the vessel.

7. A process according to claim 4, wherein the step of cleaning the attached plaque further comprises removing excess active compound from the attached plaque by brushing the sides of the plaque after scraping.

8. A process according to claim 7, wherein the step of cleaning the attached plaque further comprises brushing edges of the plaque after scraping and brushing sides of the plaque.

9. A process according to claim 7, wherein brushing occurs with brushing rollers rotating in opposite directions.

10. A process according to claim 9, wherein the step of cleaning includes lowering the plaque between the brushing rollers and thereafter raising the plaque above the brushing rollers.

11. A process according to claim 1, further comprising the step of drying the filled and cleaned plaque prior to the detaching step.

12. A process according to claim 1, wherein the attachment step comprises sequentially attaching a plurality of plaques to the transport device and wherein step b) to f) are performed simultaneously.

13. A process according to claim 12, wherein several attached electrode plaques are sequential transported through the vessel during the transport step.

14. A process according to claim 1, further comprising the step of metering in fresh active compound in a vicinity of a point at which the plaque is immersed in the vessel in an amount substantially equivalent to a removal of the active compound from the vessel by the filled plaques.

15. A process according to claim 1, wherein the active compound has a paste-like consistency.

16. A process according to claim 1, wherein a face of the plaque is oriented perpendicular to a source of vibration for the active compound.

17. A device for a continuous vibration filling with an active compound of discrete porous fiber structure electrode plaques for elective accumulators, each plaque having a current discharge lug and a major axis, the device comprising:

transport means for sequentially transporting a plurality of individual freely vertically suspended porous fiber structure electrode plaques by their current discharge lugs to individual treatment stations at an adjustment cycle time;

filling treatment station means for vibration filling of all sides of the vertically suspended porous fiber structure electrode plaque with the active compound;

stripping treatment station means for stripping excess active compound from the fiber structure electrode plaque;

cleaning treatment station means for cleaning excess active compound from the fiber structure electrode plaque; and removal means for removing a filled and cleaned fiber structure electrode plaque.

18. A device according to claim 17, wherein the filling treatment station means includes a vessel filled with active compound into which fiber structure electrode plaques are immersed by the transport means and having one or more vibrating plate means arranged substantially parallel to the major axis of an immersed plaque for oscillatory movement substantially perpendicular to the major axis of the immersed plaque.

19. A device according to claim 18, wherein the stripping treatment station includes stripping means positioned above the vessel for removing excess active compound from a filled plaque during removal from the vessel whereby stripped excess active compound is returned to the vessel.

20. A device according to claim 18, wherein a distance between a wall of the vessel and the vibrating plate means is sufficient to prevent the active compound between the wall and the vibrating plate means from splashing.

21. A device according to claim 17, wherein the cleaning treatment station means includes a first brushing station having two brush means rotatable in opposite directions for brushing sides of a filled plaque and a second brushing station for cleaning edges of the filled plaque.

22. A device according to claim 21, wherein rotatably arranged stripper roller means are associated with the two brush means.

23. A device according to claim 17, further comprising a drying means between the cleaning station means and the removal means.

* * * * *